United States Patent [19]
Oobuchi

[11] Patent Number: 6,029,218
[45] Date of Patent: Feb. 22, 2000

[54] DATA TRANSFER METHOD AND DATA TRANSFER DEVICE

[75] Inventor: Katsunari Oobuchi, Kawasaki, Japan

[73] Assignee: NEC Corporation, Tokyo, Japan

[21] Appl. No.: 09/122,062

[22] Filed: Jul. 27, 1998

[30] Foreign Application Priority Data

Jul. 29, 1997 [JP] Japan ..................................... 9-203606

[51] Int. Cl.[7] .............................. G06F 13/28; G06F 13/42
[52] U.S. Cl. .............................................. 710/110; 710/35
[58] Field of Search ................................ 710/35, 105, 21, 710/32, 11, 14, 110, 100, 36, 129, 108, 200; 709/200, 208, 232, 245; 711/1, 100; 370/463, 912; 340/825.52

[56] References Cited

U.S. PATENT DOCUMENTS

| | | | |
|---|---|---|---|
| 5,608,869 | 3/1997 | Hamstra et al. | 709/250 |
| 5,634,138 | 5/1997 | Ananthan et al. | 710/21 |
| 5,640,517 | 6/1997 | Parks et al. | 710/105 |
| 5,669,014 | 9/1997 | Iyengar et al. | 710/22 |
| 5,768,622 | 6/1998 | Lory et al. | 710/35 |
| 5,802,597 | 9/1998 | Nelsen | 711/169 |

FOREIGN PATENT DOCUMENTS

5-242017  9/1993  Japan .

*Primary Examiner*—Gopal C. Ray
*Attorney, Agent, or Firm*—Young & Thompson

[57] ABSTRACT

A data transfer method (or a data transfer device) is provided to perform data transfer between a master unit and at least one slave unit having a target by way of a bus. After issuance a transfer request to the slave unit, the master unit generates and outputs addresses for reading data of the target of the slave unit. A decision is made as to whether a single access or a burst access is designated on the basis of a relationship between the addresses. Herein, the burst access is designated in a duration that consecutive addresses are sequentially generated. In the case of the single access, the master unit performs single-access procedures, wherein the bus is released at first. Upon receipt of a signal representing completion of preparation for outputting the data of the target of the slave unit, the master unit secures the bus so as to input the data of the target by way of the bus. After the master unit completely receives the data of the target with respect to the single access, the bus is released again. In the case of the burst access, the master unit continuously outputs the addresses while retaining the bus, so that the master unit is capable of continuously accessing the slave unit. Upon receipt of the signal, the master unit inputs the data of the target, which are transferred from the slave unit to the master unit by way of the bus. After the master unit completely receives the data of the target with respect to the burst access, the bus is released.

12 Claims, 12 Drawing Sheets

FIG.3A ADDRESS BUS

FIG.3B DATA BUS

FIG.3C drdy_s1

FIG.3D dout_s1

FIG.3E BURST

(1: BURST, 0: SINGLE)

FIG.8

DATA TRANSFER METHOD AND DATA TRANSFER DEVICE

BACKGROUND OF THE INVENTION

1. Field of the Invention

This invention relates to data transfer methods and data transfer devices that perform data transfer using buses configured by integrated circuit devices. This application is based on patent application No. Hei 9-203606 filed in Japan, the content of which is incorporated herein by reference.

2. Description of the Related Art

Conventionally, as for improvements of bus transfer efficiency, the paper of Japanese Patent Application, Publication No. Hei 5-242017 discloses the technology that performs data transfer between a master unit and a slave unit, as follows:

In the case where response of a target is slow in the slave unit, the master unit does not wait for transmission of data from the slave unit while securing a bus after issuance of a transfer request, but the master unit should certainly release the bus. This technology is applied to the configuration that multiple master units and multiple slave units are connected together by way of the common bus.

With reference to timing charts of FIG. 12A to FIG. 12F, a description will be given with respect to an example of the data transfer method at a continuous read mode for a target whose response is slow. When receiving an access request, the master unit secures a bus, then, the master unit outputs an address to release the bus. At occurrence of a next access factor, the master unit secures the bus again, then, the master unit outputs an address to release the bus. In order to output data whose transfer is requested, the slave unit requests a bus (utilization) right. So, after certainly securing the bus, the slave unit outputs an address and the data. According to the conventional method described above, the release of the bus should be certainly performed, so there occurs a gap in time between the timing to release the bus and the timing to secure the bus. In addition, the master unit is designed to have a capability of merely receiving the data in a duration that the slave unit outputs the data. So, the conventional method suffers from a drawback that the data transfer efficiency should be extremely reduced.

As described above, when the master unit accesses the slave unit, the conventional data transfer method should normally release the bus after the access is completed one time. For this reason, although the slave unit is capable of continuously sending the data to the master unit, the conventional method is incapable of continuously performing data transfer. So, there is a problem that bus utilization efficiency is not so good.

SUMMARY OF THE INVENTION

It is an object of the invention to provide a data transfer method and a data transfer device that are capable of improving the bus utilization efficiency by adequately controlling the timing to release the bus.

A data transfer method (or a data transfer device) of this invention performs data transfer between a master unit and at least one slave unit having a target by way of a bus. After issuance a transfer request to the slave unit, the master unit generates and outputs addresses for reading data of the target of the slave unit. A decision is made as to whether a single access or a burst access is designated on the basis of a relationship between the addresses. Herein, the burst access is designated in a duration that consecutive addresses are sequentially generated.

In the case of the single access, the master unit performs single-access procedures, wherein the bus is released at first. Upon receipt of a signal representing completion of preparation for outputting the data of the target of the slave unit, the master unit secures the bus so as to input the data of the target by way of the bus. After the master unit completely receives the data of the target with respect to the single access, the bus is released again.

In the case of the burst access, the master unit continuously outputs the addresses while retaining the bus, so that the master unit is capable of continuously accessing the slave unit. Upon receipt of the signal, the master unit inputs the data of the target, which are transferred from the slave unit to the master unit by way of the bus. After the master unit completely receives the data of the target with respect to the burst access, the bus is released.

Because of the aforementioned way of utilization of the bus which is switched over in response to the single access or burst access, it is possible to improve a bus utilization efficiency, regardless of speed of response of the target.

BRIEF DESCRIPTION OF THE DRAWINGS

These and other objects, aspects and embodiment of the present invention will be described in more detail with reference to the following drawing figures, of which.

DESCRIPTION OF THE PREFERRED EMBODIMENT

This invention will be described in further detail by way of examples with reference to the accompanying drawings.

[A] First Embodiment

Figure 1:
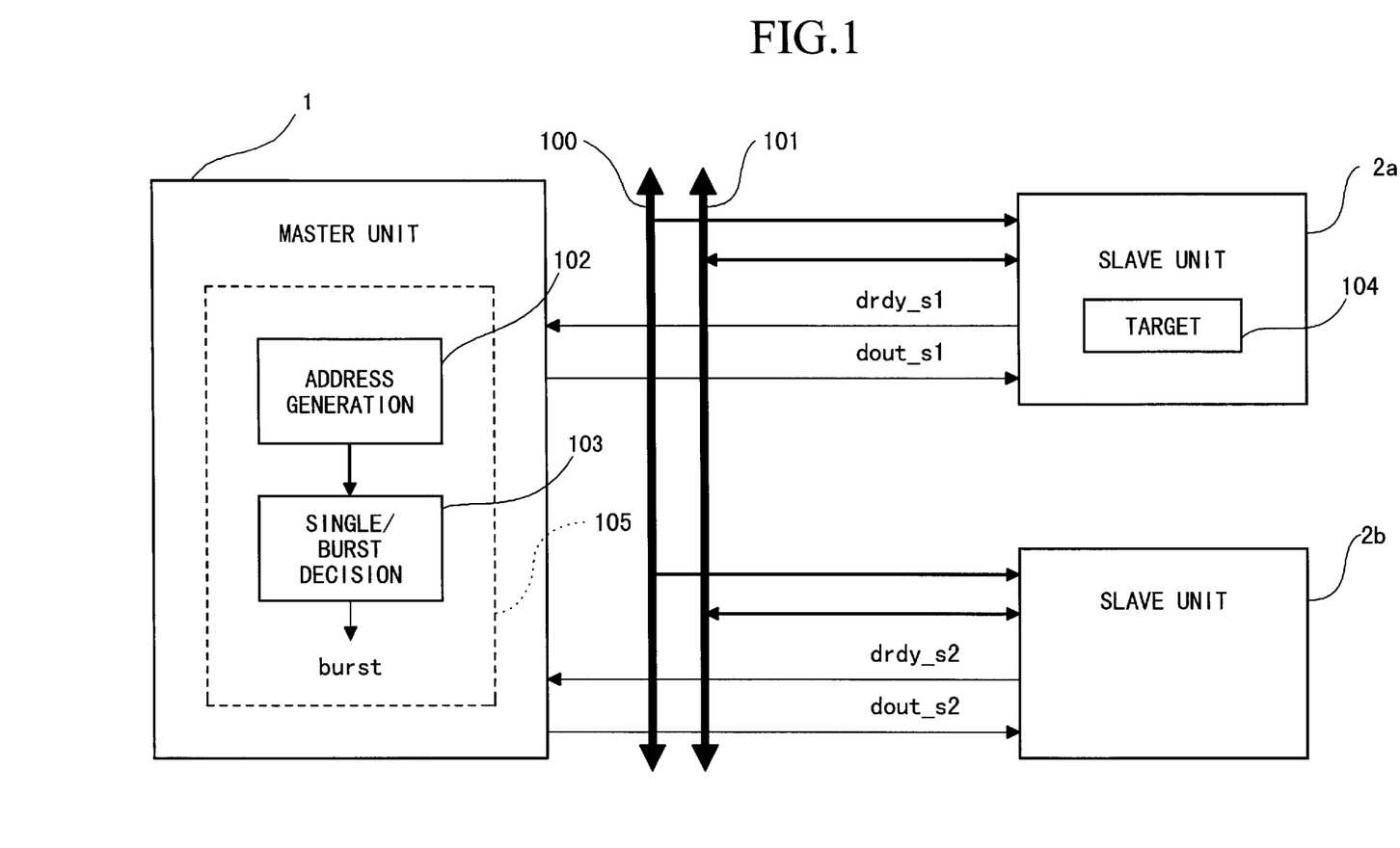
FIG. 1 is a block diagram showing a system configuration to which a data transfer method is applied in accordance with a first embodiment of the invention.
Figures 2A, 2B:
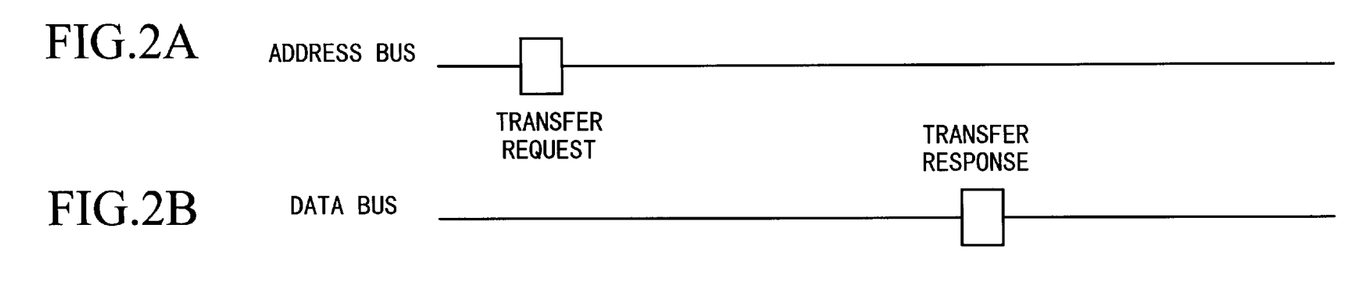
FIG. 2A, FIG. 2B, FIG. 2C, FIG. 2D and FIG. 2E are timing charts, which are used to explain a single read operation of a target whose response is slow in accordance with the data transfer method of the first embodiment.
Figure 2C:
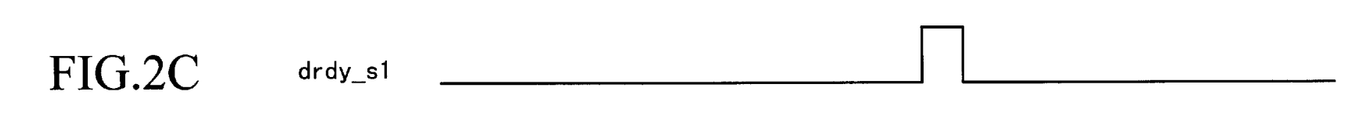
Figure 2D:
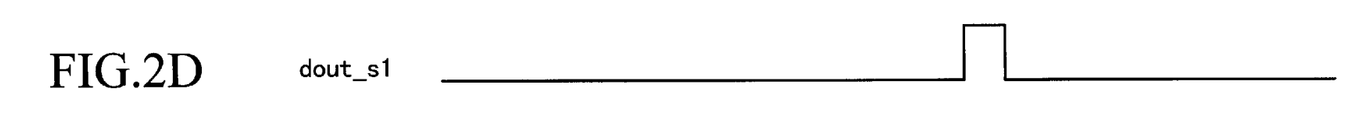
Figure 2E:
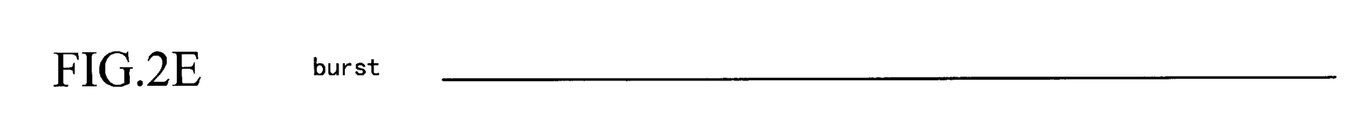
Figure 3A:
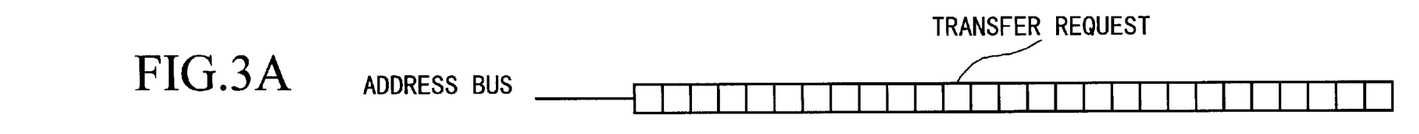
FIG. 3A, FIG. 3B, FIG. 3C, FIG. 3D and FIG. 3E are timing charts, which are used to explain a burst read operation of the target whose response is slow in accordance with the first embodiment of the data transfer method.
Figure 3B:
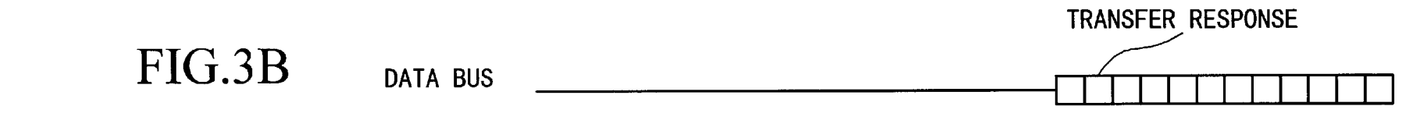
Figure 3C:
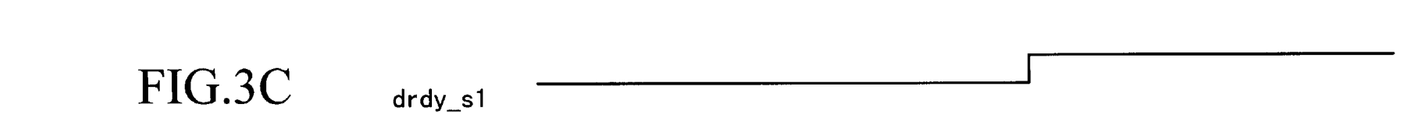
Figure 3D:
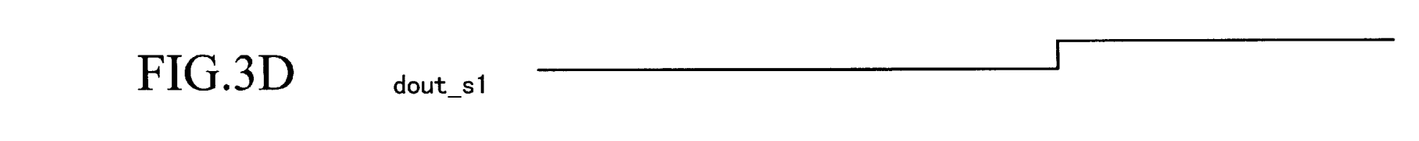
Figure 3E:
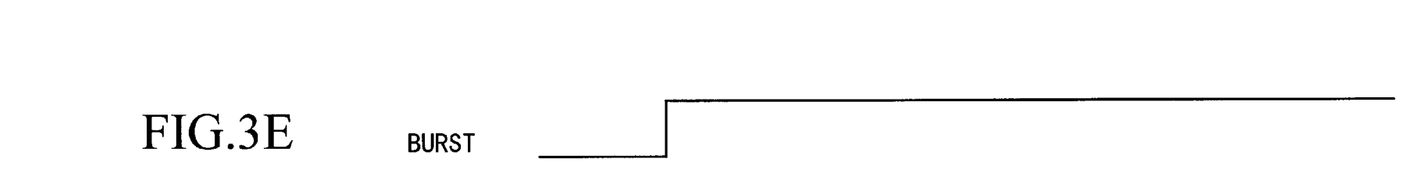

FIG. 1 is a block diagram showing a system configuration to which a data transfer method is applicable in accordance with a first embodiment of the invention. Herein, there are provided a master unit 1 and two slave units 2a, 2b, which are connected together by way of an address bus 100 and a data bus 101. A reference symbol "drdy_s1" designates a signal representing that the slave unit 2a completes preparation of read data, while "dout_s1" designates a read data output instruction signal by which the master unit 1 instructs the slave unit 2a to output the read data. Similarly, a reference symbol "drdy_s2" designates a signal representing that the slave unit 2b completes preparation of read data, while "dout_s2" designates a read data output instruction signal by which the master unit 1 instructs the slave unit 2b to output the read data.

The master unit 1 contains a single-access/burst-access switching block 105, which contains an address generation block 102 and a decision block 103. Herein, the decision block 103 makes a decision as to whether a single access or a burst access is designated by addresses generated by the address generation block 102, wherein the decision block 103 outputs a signal "burst" (hereinafter, referred to as "burst signal"). In the case of the burst access, the decision block 103 outputs "1" as the burst signal. In the case of the non-burst access (i.e., single access), the decision block 103 outputs "0" as the burst signal. In addition, the slave unit 2a is equipped with a target 104 whose response is slow.

Next, a description will be given with respect to operation of the first embodiment of the invention.

With reference to timing charts shown in FIG. 2A to FIG. 2E, a description will be given with respect to operation of the system of FIG. 1 that performs a single read operation on the low-speed target 104 provided in the slave unit 2a. In this case, the master unit 1 sends a transfer request onto the address bus 100. When making determination that burst transfer is not designated, the master unit 1 releases the bus. Thereafter, the slave unit 2a outputs a signal drdy_s1 when the target 104 completes preparation for outputting data. In response to the above signal, the master unit 1 outputs a signal dout_s1, so that the slave unit 2a outputs a transfer response onto the data bus 101. Because the above access is a single access, the decision block 105 does not activate a burst signal.

With reference to timing charts shown in FIG. 3A to FIG. 3E, a description will be given with respect to operation of the system of FIG. 1 that performs a burst read operation on the low-speed target 104 of the slave unit 2a. The master unit 1 outputs a transfer request onto the address bus 100. When making determination that burst transfer is designated, the master unit 1 continuously outputs transfer requests so as to continuously secure the bus. During the transfer requests are output, the target 104 completes preparation for outputting data. So, the slave unit 2a outputs a signal drdy_s1 to the master unit 1. In response to such a signal, the master unit 1 sends a signal dout_s1 to the slave unit 2a. Thus, the slave unit 2a continuously outputs transfer responses together with the signal drdy_s1.

[B] Second Embodiment

Next, a description will be given with respect to a second embodiment of the invention.

Figure 4:
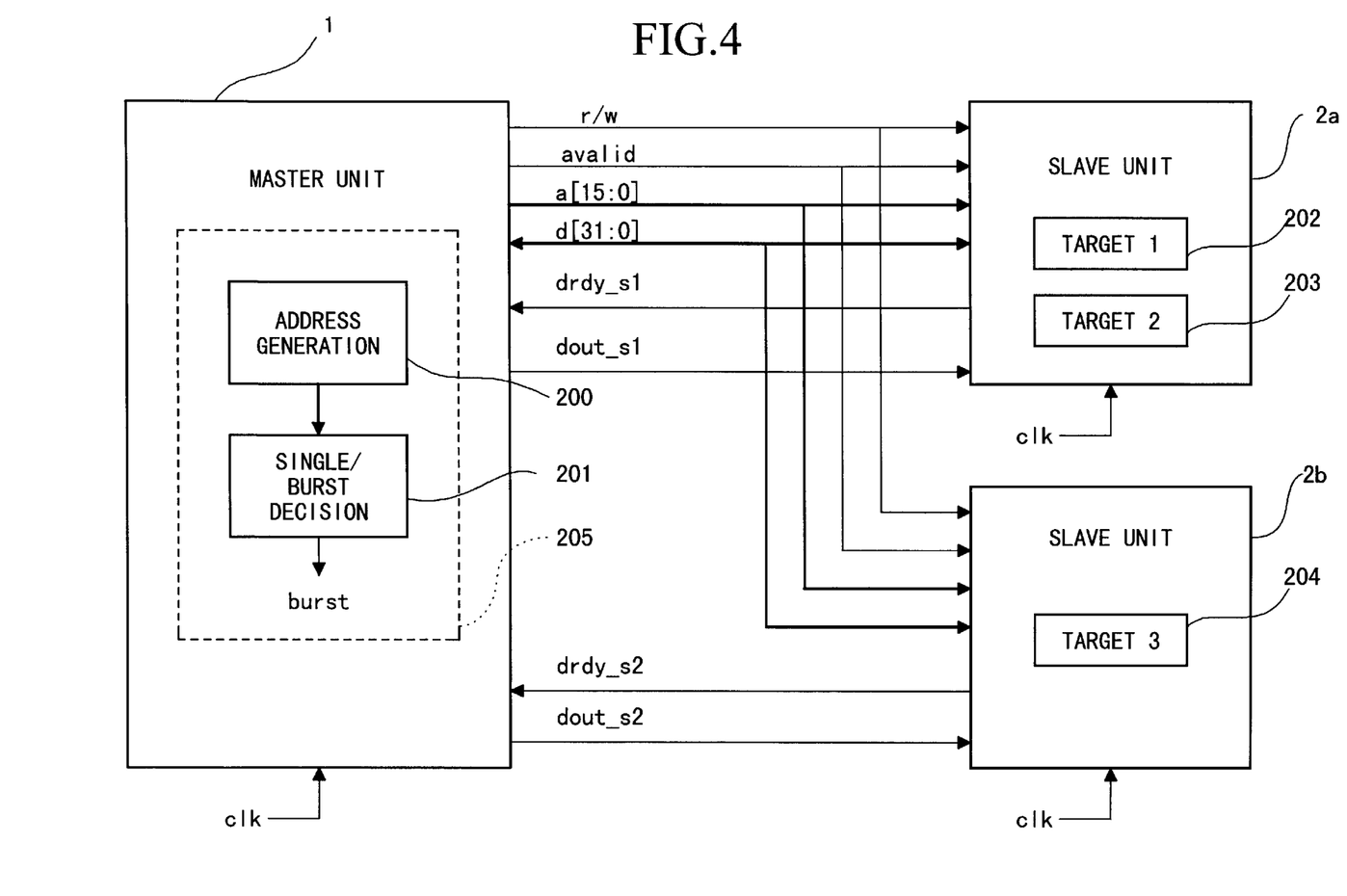
FIG. 4 is a block diagram showing a system configuration to which a data transfer method is applied in accordance with a second embodiment of the invention.

FIG. 4 is a block diagram showing a system configuration to which a data transfer method is applied in accordance with the second embodiment of the invention, wherein parts equivalent to those shown in FIG. 1 are designated by the same reference symbols. Herein, the master unit 1 and the slave units 2a, 2b are connected together by buses, which are configured by an address line "a" [15:0] and a data line "d" [31:0] as well as a line provided for transmission of a read/write discrimination signal "r/w" and a line provided for transmission of an address valid signal "avalid". Reference symbol "drdy_s1" designates a signal representing an event that the slave unit 2a completes preparation for outputting read data, while "dout_s1" designates a read data output instruction signal that the master unit 1 sends to the slave unit 2a. Similarly, reference symbol "drdy_s2" designates a signal representing an event that the slave unit 2b completes preparation for outputting read data, while "dout_s2" designates a read data output instruction signal that the master unit 1 sends to the slave unit 2b. In addition, a clock signal "clk" is input to the master unit 1 and the slave units 2a, 2b.

The master unit 1 shown in FIG. 4 contains a single-access/burst-access switching block 205, which is configured by an address generation block 200 and a decision block 201. Herein, the decision block 201 makes a decision as to whether a single access or a burst access is designated by addresses generated by the address generation unit 200. The decision block 201 outputs a "burst" signal. In the case of the burst access, the decision block 201 outputs "1" as the burst signal. In the case of non-burst access (i.e., single access), the decision block 201 outputs "0" as the burst signal.

Figure 5:
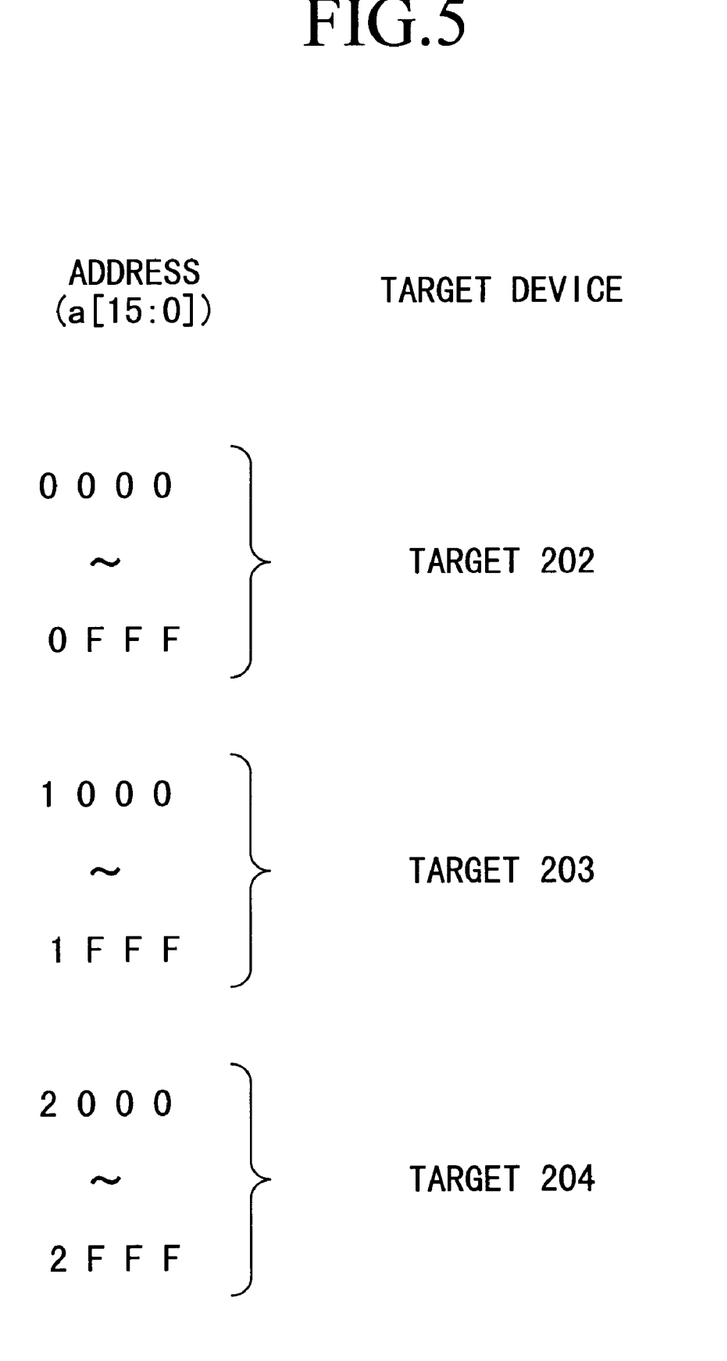
FIG. 5 is a conceptual diagram showing an address map for targets in accordance with the second embodiment of the data transfer method.

The slave unit 2a provides two targets, i.e., a target 202 (or target 1) whose response is slow and a target 203 (or target 2) whose response is fast. At the clock timing next to the clock timing when the slave unit 2a inputs an address, the target 203 is capable of outputting data. The slave unit 2b provides a target 204 (or target 3) whose response is fast. At the clock timing next to the clock timing when the slave unit 2b inputs an address, the target 204 is capable of outputting data. FIG. 5 is a conceptual diagram showing an address map for the targets 202, 203 and 204. FIG. 5 shows that the target 202 responds to addresses whose value range is set between "0000H" and "0FFFH", the target 203 responds to addresses whose value range is set between "1000H" and "1FFFH", and the target 204 responds to addresses whose value range is set between "2000H" and "2FFFH".

Figure 6:
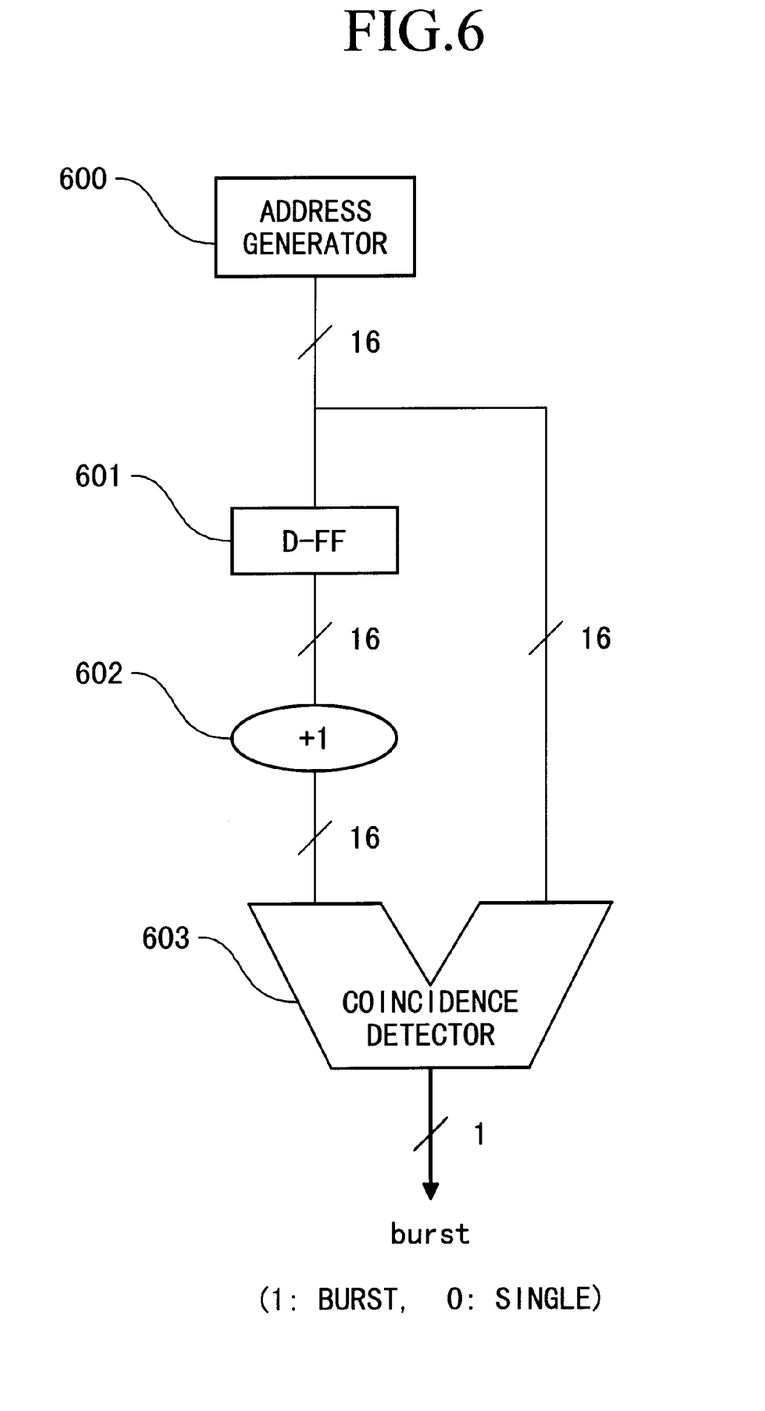
FIG. 6 is a block diagram showing an example of a configuration of a single-access/burst-access switching block of a master unit shown in FIG. 5.
Figure 7:
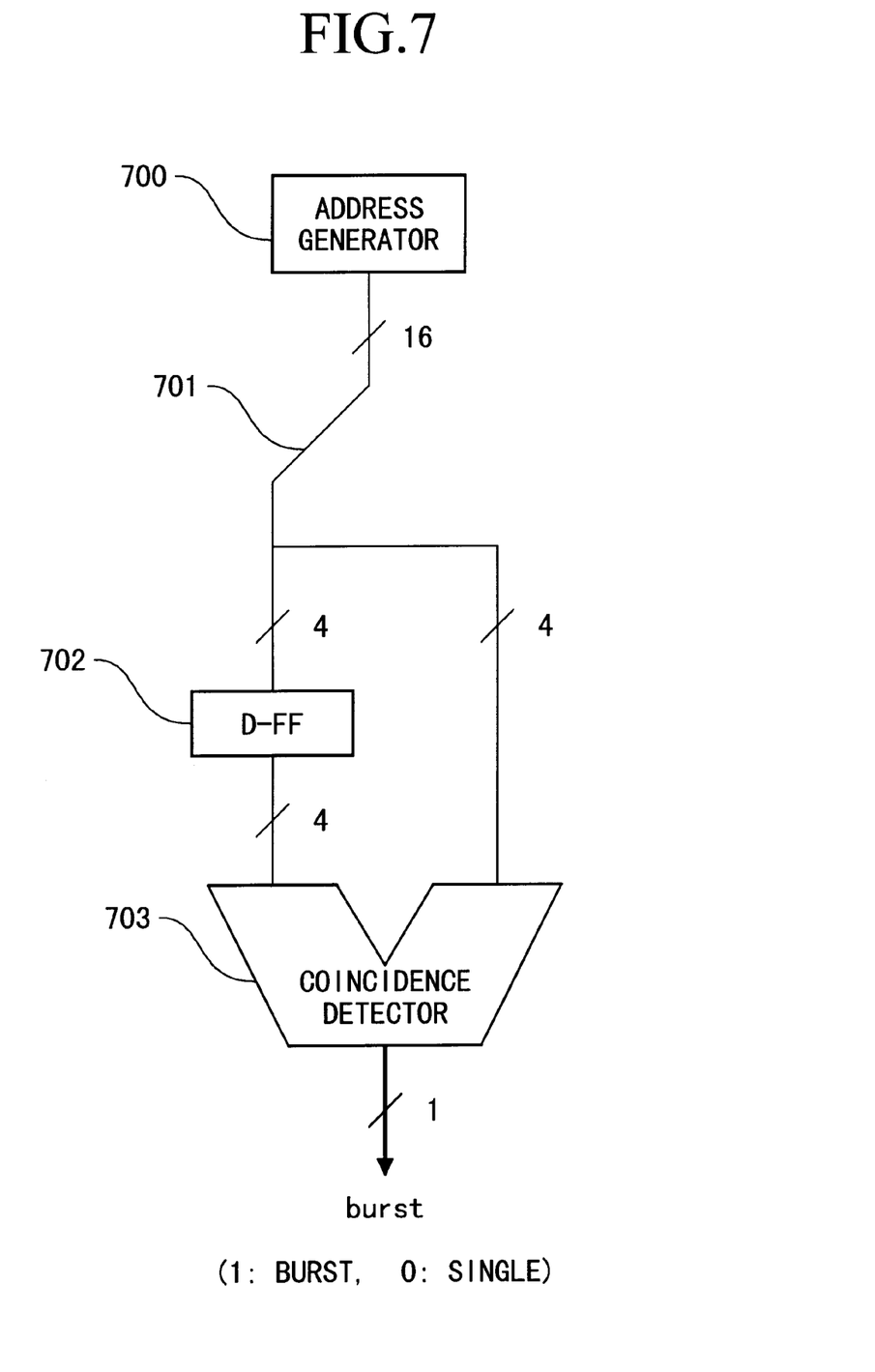
FIG. 7 is a block diagram showing another example of the configuration of the single-access/burst-access switching block of the master unit shown in FIG. 5.

With reference to FIG. 6 and FIG. 7, a description will be given with respect to configurations and decision methods for making a decision whether to designate the single access or burst access. Specifically, FIG. 6 and FIG. 7 show examples of configurations of circuits, each of which is used for the single-access/burst-access switching block 205. In FIG. 6, an address generator 600, which corresponds to the aforementioned address generation blocks 102 and 200 shown in FIG. 1 and FIG. 4 respectively, is provided to generate an address of sixteen bits, which is input to a data flip-flop 601 and a first input terminal of a coincidence detector 603. An output of the data flip-flop 601 is input to an incremental element 602. An output of the incremental element 602 is input to a second input terminal of the coincidence detector 603. Herein, the output of the incremental element 602 indicates a value that is produced by adding "1" to a preceding address preceding to a present address output from the address generator 600. So, an event that the address of the address generator 600 coincides with the output of the incremental element 602 indicates that the address generator 600 sequentially outputs consecutive addresses. In other words, a data range of consecutive addresses is designated. Incidentally, the coincidence detector 603 outputs a burst signal based on two inputs thereof. If both of the two inputs coincide with each other, the coincidence detector 603 outputs "1" as the burst signal so as to designate the burst access. If not, the coincidence detector 603 outputs "0" as the burst signal so as to designate the single access.

In FIG. 7, an address generator 700 generates an address of sixteen bits. A high-order-four-bits extractor 701 extracts only four bits, corresponding to bit 15 to bit 12, from the sixteen bits of the address. So, the extracted four bits are supplied to a data flip-flop 702 and a first input terminal of a coincidence detector 703. An output of the data flip-flop 702 is input to a second input terminal of the coincidence detector 703. Herein, the output of the data flip-flop 702 indicates high-order four bits of a preceding address preceding to a present address output from the address generator 700. So, an event that the coincidence detector 703 detects coincidence of two inputs thereof indicates that the present address coincides with the preceding address. In other words, the same data range of the same address is designated. Incidentally, the coincidence detector 703 outputs a burst signal based on two inputs thereof. Like the aforementioned coincidence detector 603, the coincidence detector 703 outputs "1" as the burst signal to designate the burst signal if both of two inputs thereof coincide with each other. If not, the coincidence detector 703 outputs "0" as the burst signal to designate the single access.

Next, a description will be given with respect to operation of the data transfer method in accordance with the second embodiment of the invention.

Figure 8:
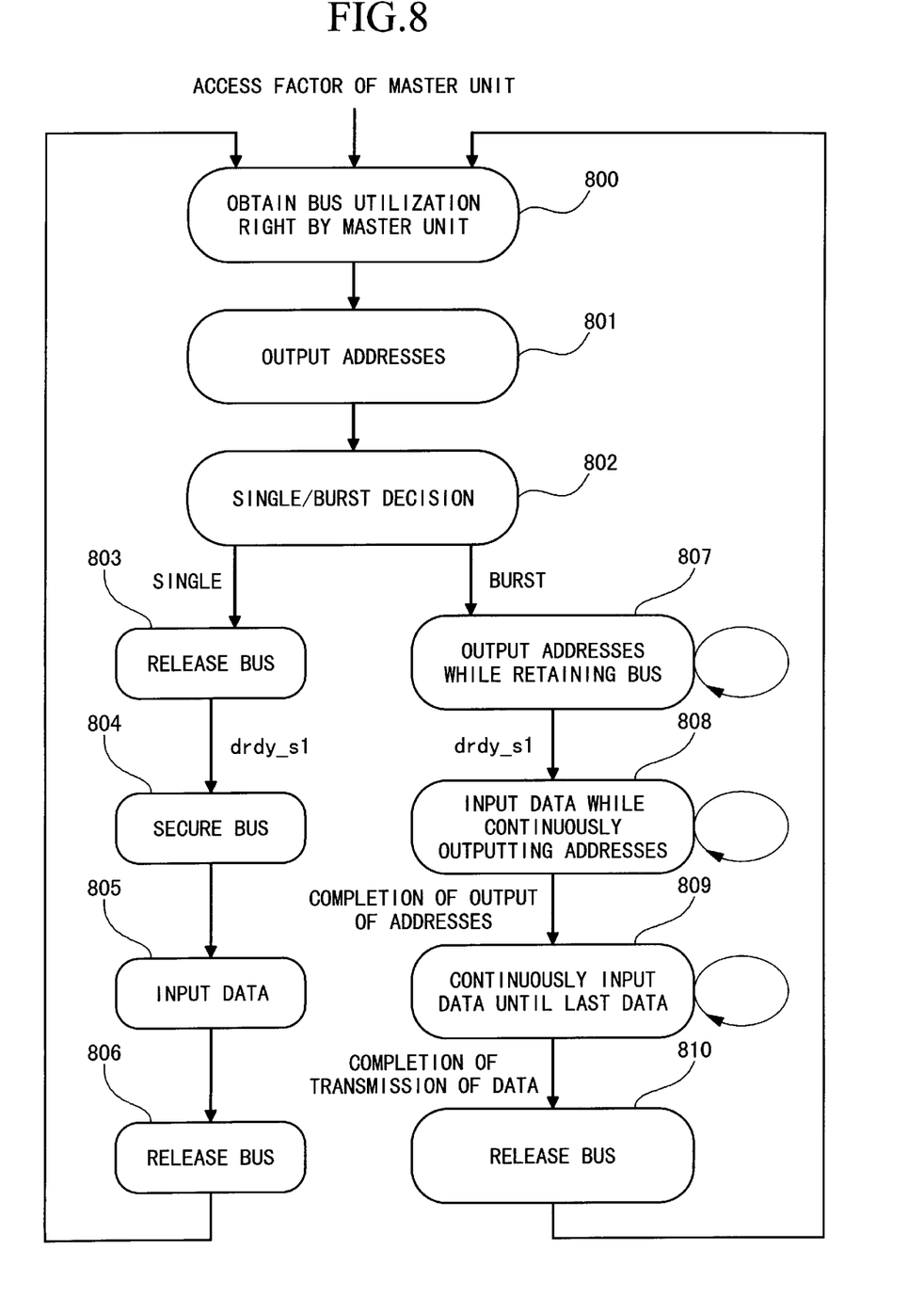
FIG. 8 is a flowchart showing a flow of steps for data transfer processing with regard to the master unit of FIG. 5.
Figure 9A:
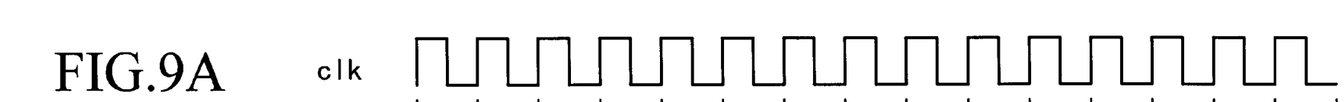
FIG. 9A, FIG. 9B, FIG. 9C, FIG. 9D, FIG. 9E, FIG. 9F, FIG. 9G, FIG. 9H and FIG. 9I are timing charts, which are used to explain read operations that the second embodiment of the data transfer method performs with respect to a target whose response is slow and a target whose response is fast.
Figure 9B:
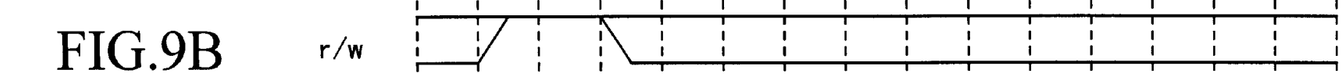
Figure 9C:
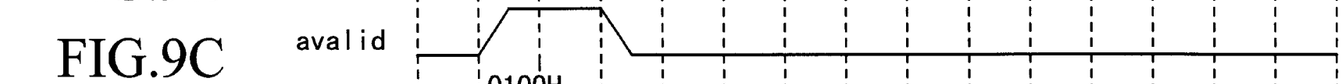
Figure 9D:
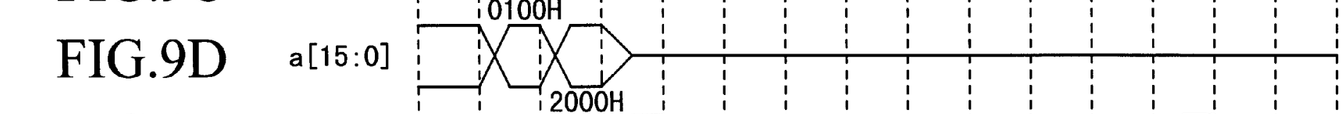
Figures 9E, 9F:
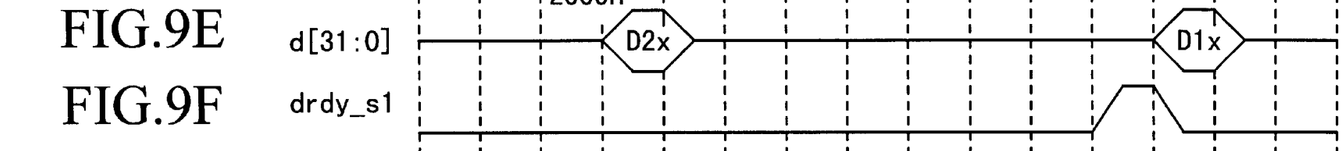
Figure 9G:
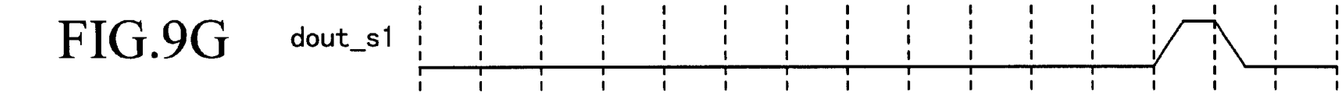
Figure 9H:
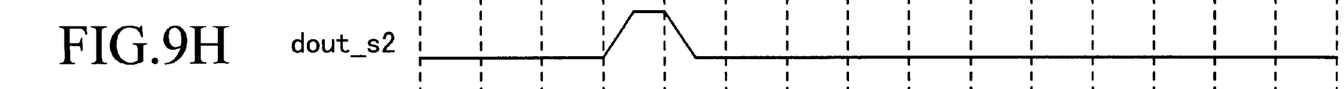
Figure 9I:
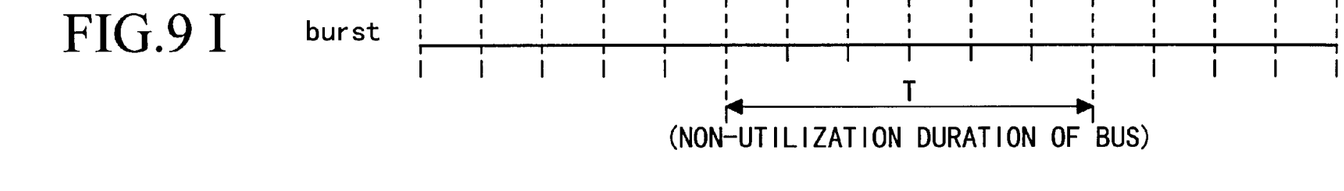
Figures 10A, 10B:
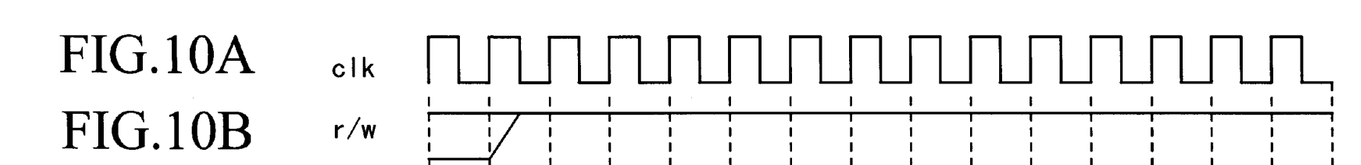
FIG. 10A, FIG. 10B, FIG. 10C, FIG. 10D, FIG. 10E, FIG. 10F, FIG. 10G and FIG. 10H are timing charts, which are used to explain a beginning part of burst reading operations that the second embodiment of the data transfer method performs with respect to a target whose response is slow.
Figures 10C, 10D:
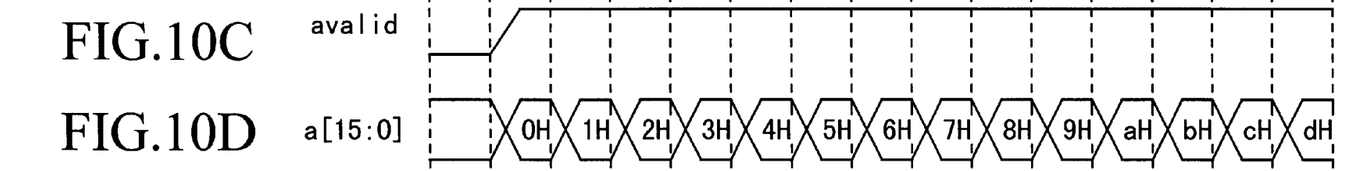
Figures 10E, 10F:
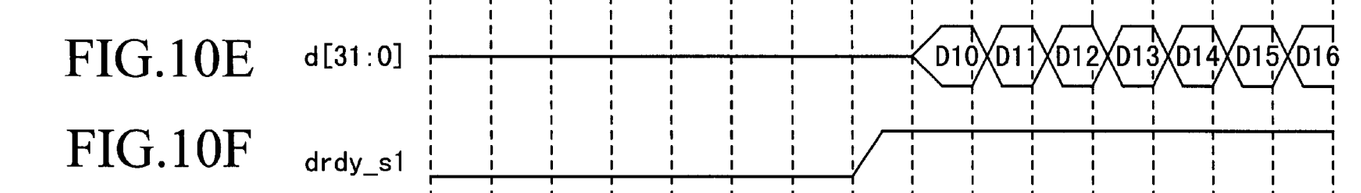
Figure 10G:
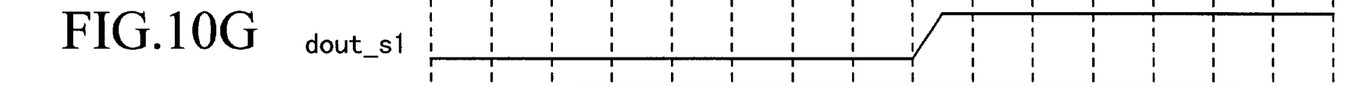
Figure 10H:
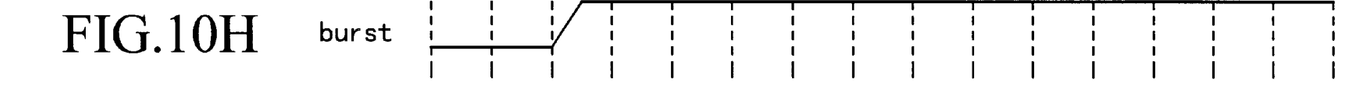

FIG. 8 is a flowchart showing a flow of steps with regard to data transfer processing of the invention. When an access factor occurs in the master unit 1, the master unit 1 proceeds to step S800 to obtain a bus utilization right. After securing the bus, the master unit 1 transfers control to step S801 so as to output a first address. In step S802, a decision is made, using a second address, as to whether a single access or a burst access is designated. In the case of the single access, the master unit 1 proceeds to step S803 to release the bus. Thereafter, when a signal drdy_s1 given by the slave unit 2a is sent to the master unit 1, the master unit 1 proceeds to step S804 to secure the bus. In step S805, the master unit 1 receives data from the slave unit 2a by way of the secured bus. Thereafter, in step S806, the master unit 1 releases the bus. Then, the master unit 1 reverts control to step S800 so as to wait for occurrence of a next access factor.

On the other hand, if in step S802, the master unit 1 determines that the burst access is designated, the mater unit 1 proceeds to step S807 so as to continue outputting addresses while retaining the bus. Thereafter, when a signal drdy_s1 given by the slave unit 2a is sent to the master unit 1, the master unit 1 transfers control to step S808 so as to output a signal dout_s1 to the slave unit 2a. Thus, the master unit 1 inputs data from the slave unit 2a by way of the bus while continuously outputting addresses. At completion of outputting of the addresses, the master unit 1 transfers control to step S809. Herein, the master unit 1 continues to input data until last data. At the timing of the last data, the slave unit 2a makes the signal drdy_s1 inactive. Thus, the master unit 1 confirms an end of transmission of the data so as to proceed to step S810. In step S810, the master unit 1 makes the signal dout_s1 inactive so as to release the bus. Then, the master unit 1 reverts control to step S800 so as to wait for occurrence of a next access factor.

Next, a description will be given with respect to a concrete example of the operation of the second embodiment of FIG. 4.

With reference to FIG. 9A to FIG. 9I, a description will be given with respect to a case that a reading operation is performed on the low-speed target 202 of the slave unit 2a one time, then, a reading operation is performed on the high-speed target 204 of the slave unit 2b one time. In this case, the master unit 1 outputs a read/write discrimination signal r/w and an address valid signal avalid, while the master unit 1 also outputs an address "0100H" onto the address line a [15:0]. Herein, a next address is "2000H" designating the target 204 of the slave unit 2b, which is capable of outputting data one clock pulse later. So, the master unit 1 outputs such an address "2000H" to follow the address "0000H" without releasing the bus. At the next timing when no access factor occurs, the master unit 1 makes the address valid signal avalid inactive so as to stop outputting the address. The master unit 1 knows that at the next clock pulse timing, the slave unit 2b outputs the data. So, the master unit 1 outputs a signal dout_s2 without waiting to receive a signal drdy_s2. Thus, the slave unit 2b outputs data "D2x" of the target 204 onto the data line d [31:0]. When receiving the data D2x, the master unit 1 releases the bus.

On the other hand, when the target 202 completes preparation for outputting data, the slave unit 2a outputs a signal drdy_s1. At this time, no other access factor occurs so that the master unit 1 is capable of receiving the data. So, the master unit 1 outputs a signal dout_s1. In response to such a signal, the slave unit 2a outputs data "D1x" of the target 202. During such a period of access, a duration T represents a non-utilization duration of the bus. Therefore, the master unit 1 is capable of performing other accesses in the duration T. Or, if another master unit is connected to the system, it is capable of performing an access in the duration T. Incidentally, the present period of access corresponds to the single access, so the burst signal is not made active.

Next, with reference to FIG. 10A to FIG. 10H as well as FIG. 11A to FIG. 11H, a description will be given with respect to a case where reading operations are continuously performed on the low-speed target 202 of the slave unit 2a. In this case, the master unit 1 outputs a read/write discrimination signal r/w and an address valid signal avalid, while the master unit 1 also outputs an address "000H" (which is represented by a shortened form of code of "0H" in the figures) onto the address line a [15:0]. Herein, a next address is "0001H" (which is represented by a shortened form of code of "1H" in the figures). The above addresses are consecutive addresses, so it is possible to determine that the burst access is designated. Thus, the burst signal is made active. A further next address following the above next address is "0002H", which is represented by "2H" in the figures. Such a further next address is consecutive to the next address as well. Therefore, it is determined again that the burst access is designated, so the burst signal is retained in an active state. As described above, the master unit 1 sequentially outputs the consecutive addresses so as to continuously secure the bus.

Figure 11A:
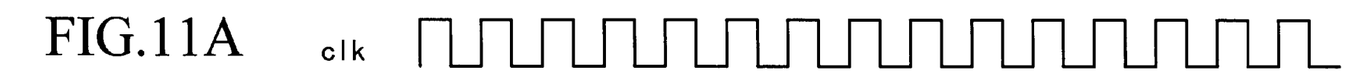
FIG. 11A, FIG. 11B, FIG. 11C, FIG. 11D, FIG. 11E, FIG. 11F, FIG. 11G and FIG. 11H are timing charts, which are used to explain an end part of the burst reading operations that the second embodiment of the data transfer method performs with respect to the target whose response is slow.
Figure 11B:
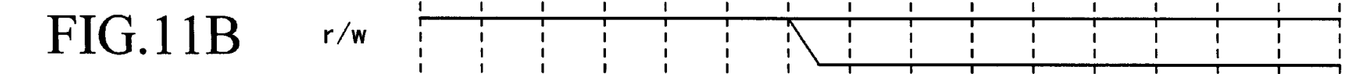
Figure 11C:
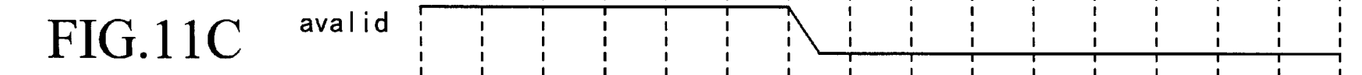
Figure 11D:
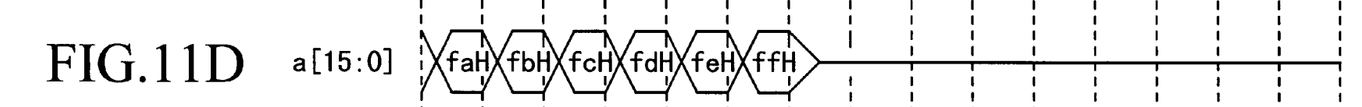
Figure 11E:
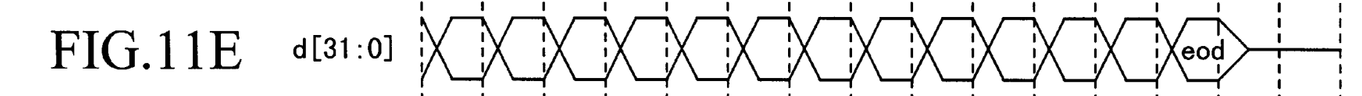
Figure 11F:
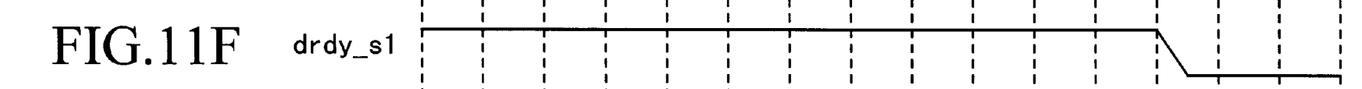
Figure 11G:
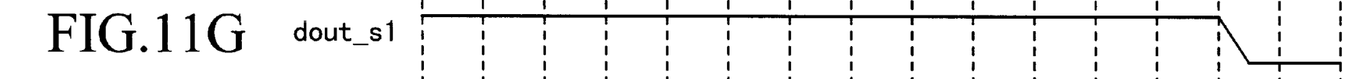
Figure 11H:
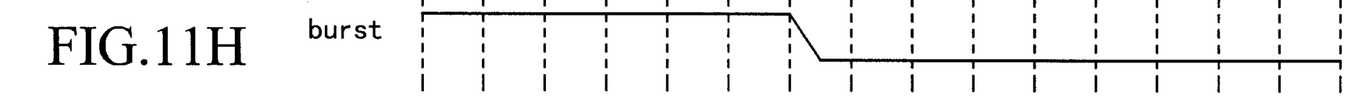
Figure 12A:
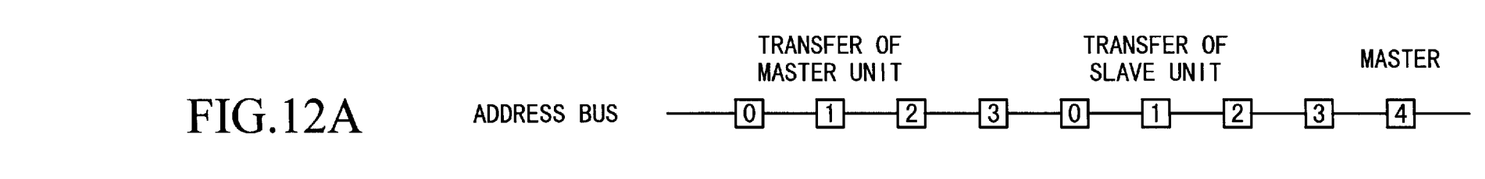
FIG. 12A, FIG. 12B, FIG. 12C, FIG. 12D, FIG. 12E and FIG. 12F are timing charts, which are used to explain the conventional data transfer method.
Figure 12B:
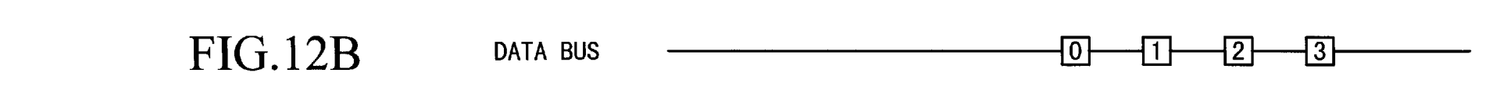
Figure 12C:
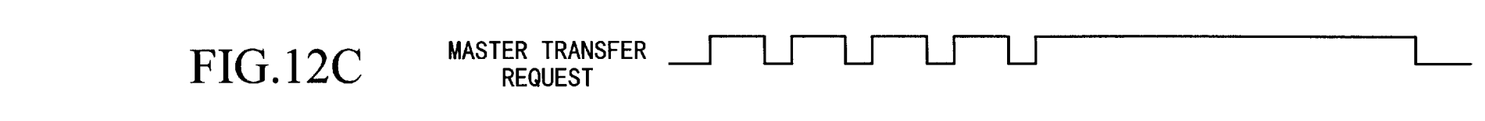
Figure 12D:
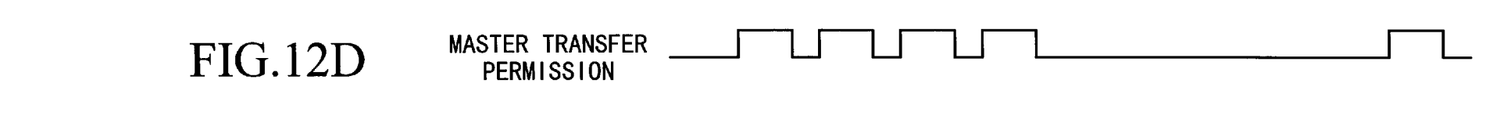
Figure 12E:
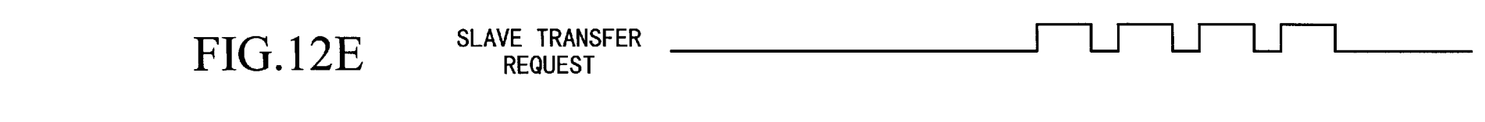
Figure 12F:
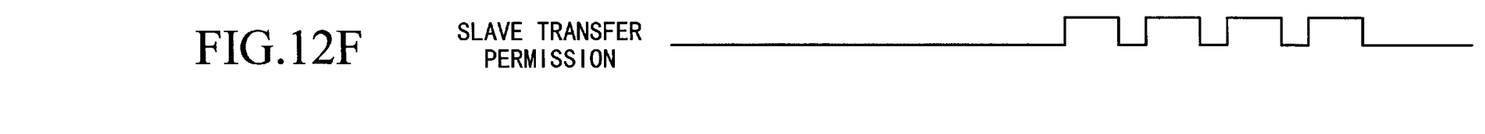

Thereafter, when the target 202 completes preparation for outputting data, the slave unit 2a outputs a signal drdy_s1. Because the master unit 1 is capable of receiving the data, the master unit 1 sends a signal dout_s1 to the slave unit 2a, so that the slave unit 2*a* continuously outputs the data together with the signal drdy_s1. As shown in FIG. 11D, a last address is "00FFH", which is represented by "ffH". If the access factor disappears after issuance of such a last address, the master unit 1 makes the address valid signal avalid inactive so as to stop outputting the address. Before output of last data "eod", the slave unit 2*a* makes the signal drdy_s1 inactive. Thus, the master unit 1 is capable of recognizing the last data, then, the master unit 1 makes the signal dout_s1 inactive.

The conventional technology requires at least two cycles of access in order to release and secure the bus. Therefore, the conventional technology is incapable of transferring data continuously. In contrast to the conventional technology, the present embodiments are capable of demonstrating double transfer speed, which is double of the transfer speed of the conventional technology, with respect to the burst read operations.

Moreover, this invention is designed such that the master unit makes a decision as to whether the burst access or single access is designated, wherein in the case of the burst access, the data transfer is continued without release of the bus, while in the case of the single access, the master unit releases the bus. Thus, it is possible to improve the bus utilization efficiency.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds are therefore intended to be embraced by the claims.

What is claimed is:

1. A data transfer method for performing data transfer between a master unit and a slave unit by way of a bus in response to a transfer request issued by the master unit, said data transfer method comprising the steps of:

making a decision by the master unit as to whether a burst access or a single access is designated for the data transfer;

continuing the data transfer from the slave unit to the master unit without releasing the bus if the burst access is designated; and releasing the bus if the single access is designated.

2. A data transfer method as defined in claim 1 wherein the master unit decodes addresses for the slave unit to make determination that the single access is designated if the slave unit has slow response while the burst access is designated if the slave unit has fast response.

3. A data transfer device comprising:

a slave unit for storing data; and a master unit for requesting the slave unit to transfer the data thereto by way of a bus, wherein the master unit contains switching means for making a decision as to whether a burst access or a single access is designated and for continuing transfer of the data without releasing the bus if the burst access is designated and for releasing the bus if the single access is designated.

4. A data transfer device as defined in claim 3 wherein the switching means of the master unit comprises address generation means for sequentially generating addresses for the slave unit, and single/burst decision means for decoding the addresses to make determination that the single access is designated if the slave unit has slow response while the burst access is designated if the slave unit has fast response.

5. A data transfer device as defined in claim 4 wherein the single/burst decision means comprises retaining means for temporarily retaining a preceding address preceding to a present address presently generated by the address generating means, increment means for adding an increment to a value of the preceding address retained by the retaining means, and coincidence detection means for detecting coincidence between an output of the increment means and the present address, wherein it is determined that the burst access is designated if the coincidence is detected while the single access is designated if the coincidence is not detected.

6. A data transfer device as defined in claim 5 wherein the single/burst decision means comprises high-order-bits extraction means for extracting high-order bits from the address generated by the address generation means, retaining means for temporarily retaining the high-order bits, which are extracted by the high-order-bits extraction means, and coincidence detection means for detecting coincidence between the extracted high-order bits, which are temporarily retained and are then output from the retaining means to represent a part of a preceding address, and high-order bits which are extracted from a present address presently generated by the address generation means, wherein it is determined that the burst access is designated if the coincidence is detected while the single access is designated if the coincidence is not detected.

7. A data transfer method for performing data transfer between a master unit and a slave unit by way of a bus in response to a transfer request issued by the master unit, said data transfer method comprising the steps of:

securing the bus when an access factor occurs in the master unit;

outputting a first address when the bus is completely secured;

making a decision as to whether a single access or a burst access is designated on the basis of addresses sequentially generated by the master unit;

if it is determined that the single access is designated, releasing the bus, and then securing the bus upon receipt of a signal representing completion of preparation of read data of the slave unit, so that the master unit receives the read data from the slave unit by way of the bus;

releasing the bus after the master unit completely receives the read data with respect to the single access;

if it is determined that the burst access is designated, continuously outputting the addresses while retaining the bus, and then outputting a read data output instruction signal from the master unit to the slave unit upon receipt of a signal representing completion of preparation of read data of the slave unit, so that the master unit receives the read data from the slave unit by way of the bus;

releasing the bus after the master unit completely receives the read data with respect to the burst access; and waiting for occurrence of a next access factor.

8. A data transfer method for performing data transfer between a master unit and at least one slave unit having a target, said data transfer method comprising the steps of:

issuing a transfer request by the master unit so as to request the slave unit to transfer data of the target;

sequentially generating addresses for reading the data of the target;

making a decision as to whether a single access or a burst access is designated on the basis of a relationship between the addresses;

performing single-access procedures to perform the single access on the slave unit to transfer the data of the target to the master unit if the single access is designated; and performing burst-access procedures to continuously access the slave unit so as to sequentially transfer the data of the target to the master unit if the burst access is designated.

9. A data transfer method as defined in claim 8 wherein the burst access is designated in a duration that consecutive addresses are sequentially generated.

10. A data transfer method as defined in claim 8 wherein the single-access procedures comprise the steps of:

releasing the bus;

securing the bus if the master unit receives a signal representing completion of preparation for outputting the data of the target of the slave unit;

inputting the data of the target, which are transferred from the slave unit to the master unit by way of the bus; and releasing the bus again after the master unit completely receives the data of the target with respect to the single access.

11. A data transfer method as defined in claim 8 wherein the burst-access procedures comprises the steps of:

continuously outputting the addresses while retaining the bus;

inputting the data of the target, which are transferred from the slave unit to the master unit by way of the bus, if the master unit receives a signal representing completion of preparation for outputting the data of the target of the slave unit; and releasing the bus after the master unit completely receives the data of the target with respect to the burst access.

12. A data transfer method as defined in claim 8 wherein the target of the slave unit responds to only a prescribed range of addresses.

* * * * *